US012128563B2

United States Patent
Ye et al.

(10) Patent No.: US 12,128,563 B2
(45) Date of Patent: Oct. 29, 2024

(54) MACHINE-LEARNABLE ROBOTIC CONTROL PLANS

(71) Applicant: Intrinsic Innovation LLC, Mountain View, CA (US)

(72) Inventors: Ning Ye, Palo Alto, CA (US); Maryam Bandari, San Francisco, CA (US); Klas Jonas Alfred Kronander, Uppsala (SE); Bala Venkata Sai Ravi Krishna Kolluri, Fremont, CA (US); Jianlan Luo, Mountain View, CA (US); Wenzhao Lian, Fremont, CA (US); Chang Su, Redmond, WA (US)

(73) Assignee: Intrinsic Innovation LLC, Mountain View, CA (US)

( * ) Notice: Subject to any disclaimer, the term of this patent is extended or adjusted under 35 U.S.C. 154(b) by 522 days.

(21) Appl. No.: 17/398,537

(22) Filed: Aug. 10, 2021

(65) Prior Publication Data
US 2023/0046520 A1    Feb. 16, 2023

(51) Int. Cl.
B25J 9/16 (2006.01)
G06N 20/00 (2019.01)

(52) U.S. Cl.
CPC ............. *B25J 9/163* (2013.01); *B25J 9/1661* (2013.01); *G06N 20/00* (2019.01)

(58) Field of Classification Search
CPC .......... B25J 9/163; B25J 9/1661; G06N 20/00
See application file for complete search history.

(56) References Cited

U.S. PATENT DOCUMENTS

2021/0362328 A1* 11/2021 Kolluri .................... B25J 13/06

OTHER PUBLICATIONS developer.nvidia.com [online], "Accelerating Robotics Simulation with NVIDIA Omniverse Isaac Sim," Sep. 9, 2020, retrieved on Feb. 2, 2022, retrieved from URL<https://developer.nvidia.com/blog/accelerating-robotics-simulation-with-nvidia-omniverse-isaac-sim//>, 3 pages.

(Continued)

*Primary Examiner* — Jaime Figueroa
*Assistant Examiner* — Jamal A Shah
(74) *Attorney, Agent, or Firm* — Fish & Richardson P.C.

(57) ABSTRACT

Methods, systems, and apparatus, including computer programs encoded on computer storage media, for using learnable robotic control plans. One of the methods comprises obtaining a learnable robotic control plan comprising data defining a state machine that includes a plurality of states and a plurality of transitions between states, wherein: one or more states are learnable states, and each learnable state comprises data defining (i) one or more learnable parameters of the learnable state and (ii) a machine learning procedure for automatically learning a respective value for each learnable parameter of the learnable state; and processing the learnable robotic control plan to generate a specific robotic control plan, comprising: obtaining data characterizing a robotic execution environment; and for each learnable state, executing, using the obtained data, the respective machine learning procedures defined by the learnable state to generate a respective value for each learnable parameter of the learnable state.

18 Claims, 4 Drawing Sheets

(56) References Cited

OTHER PUBLICATIONS github.com [online], "AgentFlow: A Modular Toolkit for Scalable RL Research," Jul. 2021, retrieved on Feb. 2, 2022, retrieved from URL <https://github.com/deepmind/dm_robotics/blob/main/py/agentflow/README.md/>, 2 pages.

Grigorov et al., "Template design and automatic generation of controllers for industrial robots," Proceedings of the 2008 ACM Symposium on Applied Computing (SAC), Mar. 2008, pp. 1612-1613.

nist.gov [online], "Advancing the State of Machine Learning for Manufacturing Robotics," Feb. 13, 2020, retrieved on Feb. 2, 2022, retrieved from URL <https://www.nist.gov/el/intelligent-systems-division-73500/advancing-state-machine-learning-manufacturing-robotics/>, 7 pages.

Quere et al., "Shared Control Templates for Assistive Robotics," 2020 IEEE International Conference on Robotics and Automation, May 2020, 8 pages.

\* cited by examiner

MACHINE-LEARNABLE ROBOTIC CONTROL PLANS

BACKGROUND

This specification relates to frameworks for software control systems.

A software control system is a software system that controls the actions of physical devices, e.g., actuators or robots. Some software control systems are real-time software control systems that control real-time systems. A real-time software control system must execute its control routines within strict timing requirements to achieve normal operation. The timing requirements often specify that certain actions must be executed or outputs must be generated within a particular time window in order for the system to avoid entering a fault state. In the fault state, the system can halt execution or take some other action that interrupts normal operation.

Such real-time software control systems are often used to control physical machines that have high precision and timing requirements. As one example, an execution environment of industrial robots can be controlled by a real-time software control system that requires each robot to repeatedly receive commands at a certain frequency, e.g., 1, 10, or 100 kHz. If one of the robots does not receive a command during one of the periodic time windows, the robot can enter a fault state by halting its operation or by automatically returning to a predetermined maintenance position.

Software control systems for physical machines are often implemented by closed software modules that are configured specifically for a highly-specialized tasks. For example, a robotic component that picks components for placement on a printed circuit board can be controlled by a closed software system that controls each of the low-level picking and placing actions. Often, a robotic control plan for driving one or more robotic components to accomplish a task is hand-engineered by a team of highly-trained engineers, often requiring hundreds or thousands of hours of high-skilled labor.

SUMMARY

This specification describes a system that can process a template robotic control plan that is configurable to a range of different robotics applications in order to generate a specific robotic control plan that is configured for a specific robotic application. This specification also describes a system that can execute a machine learning procedure defined by a learnable robotic control plan in order to determine machine-learned parameters for a specific robotic control plan.

In this specification, a robotic control plan is data defining one or more operations to be executed by one or more robotic components to accomplish a robotic task. A robotic control system can use a robotic control plan to drive the movements of the robotic components to accomplish the robotic task.

In this specification, a template robotic control plan is a robotic control plan that can be configured for multiple different robotics applications. That is, the template robotic control plan can be configured for one or more of: multiple different robotic tasks, multiple different robotic execution environments, multiple different robotic components, or multiple different sets of constraints on the execution of the robotic control plan.

In this specification, a learnable robotic control plan is a robotic control plan that defines one or more machine learning procedures that can be executed to generate respective values for one or more learnable parameters of the learnable robotic control plan. Some learnable robotic control plans are template robotic control plans; that is, a template robotic control plan can define one or more machine learning procedures for configuring the template. Some other learnable robotic control plans are not template robotic control plans; that is, the learnable robotic control plan is configured for a single specific robotic application (e.g., a single robotic task, a single robotic execution environment, etc.), and defines machine learning procedures for improving the execution of the robotic control plan for the single specific robotic application.

In this specification, a specific robotic control plan is a robotic control plan that has been generated from a template robotic control plan or a learnable robotic control plan. When generated from a template robotic control plan, a specific robotic control plan can be configured for one or more of: a specific robotic task, a specific robotic execution environment, a specific set of robotic components, or a specific set of constraints on the execution of the robotic control plan. When generated from a learnable robotic control plan, a specific robotic control plan can include parameters whose values have been determined by executing the machine learning procedures of the learnable robotic control plan.

After generating a specific robotic control plan, the system can cause the specific robotic control plan to be executed by one or more robotic components in a robotic execution environment, e.g., by providing the specific robotic control plan to a robotic control system that controls the robotic components.

Particular embodiments of the subject matter described in this specification can be implemented so as to realize one or more of the following advantages.

As described above, in many existing systems, to generate a new robotic control plan for a new robotics application, robotics engineers must start from scratch and manually configure the new robotic control plan. Sometimes this requires hardcoding each operation of the robotic components that are to execute the robotic control plan. This process can be time-intensive, labor-intensive, and cost-intensive.

Using techniques described in this specification, a system can process a template robotic control plan that is configurable for multiple different robotics applications to automatically generate a specific robotic control plan for a specific robotics application. Thus, the same template robotic control plan can be used multiple times to generate respective different specific robotic control plans. This can significantly reduce the time and labor required to generate a new plan. Furthermore, in some implementations, the template robotic control plan can be obtained by multiple different entities and configured for their respective specific use cases.

Using techniques described in this specification, a system can process a learnable robotic control plan using machine learning procedures to automatically generate a specific robotic control plan. The machine learning procedures can automatically improve the performance of the specific robotic control plan by learning optimal values for a set of learnable parameters. This improved performance can be critical in new robotic execution environments in which the learnable robotic control plan has never been executed, as the machine learning procedures can learn optimal values for learnable parameters that are different from values that were pre-trained or pre-selected when the system did not have information about the new robotic execution environment. Furthermore, this process can reduce the time and labor required to generate a new robotic control plan, as the operations of the robotic components do not have to be manually hardcoded by engineers.

In some implementations described in this specification, a learnable robotic control plan or template robotic control plan can be used by non-expert users to generate specific robotic control plans. Traditionally, generating a new robotic control plan required significant domain expertise, making it difficult or impossible for non-expert users to leverage robots for their needs. Thus, some techniques described in this specification enable a significantly wider population to generate specific robotic control plans for their respective robotics applications.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
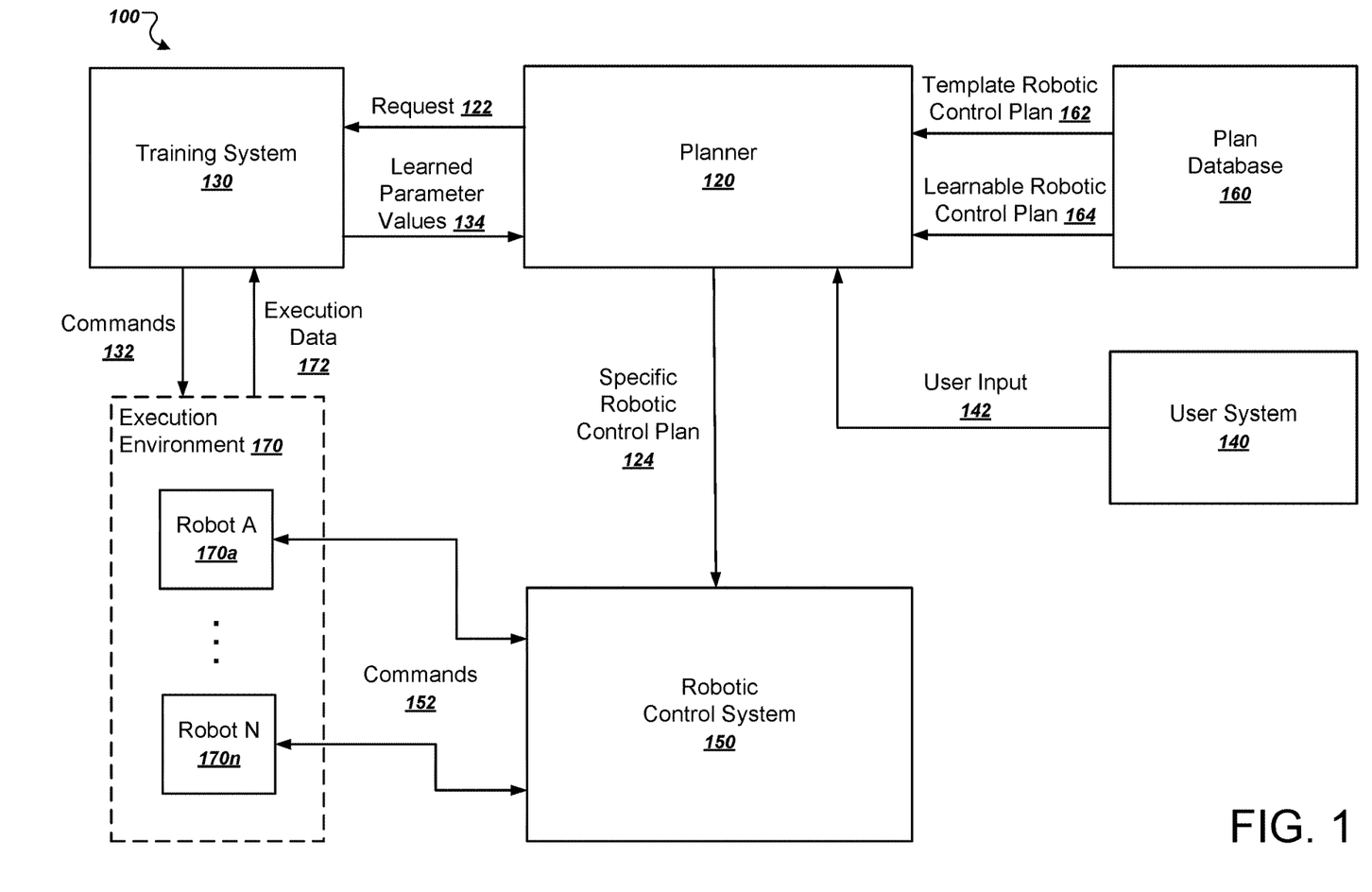
FIG. 1 is a diagram that illustrates an example system.

FIG. 1 is a diagram that illustrates an example system 100. The system 100 is an example of a system that can implement the techniques described in this specification.

The system 100 includes a number of functional components, including a planner 120, a training system 130, a user system 140, a robotic control system 150, and a plan database 160. Each of these components can be implemented as computer programs installed on one or more computers in one or more locations that are coupled to each other through any appropriate communications network, e.g., an intranet or the Internet, or combination of networks. The system 100 also includes an execution environment 170 that includes N robotic components 170a-n, N≥1.

The robotic control system 150 is configured to control the robotic components 170a-n in the execution environment 170 to execute a robotic task, or for brevity, a "task." In some implementations, the robotic control system 150 is a real-time robotic control system. That is, the robotic control system 150 must satisfy one or more hard time constraints in the operation of the execution environment 170. For example, one of the robots in the execution environment 170 may be required to perform a certain operation at regular intervals, e.g., 10 milliseconds; if the robot ever fails to execute the operation in a given time window, then the robot enters a fault state.

The overall goal of the planner 120 is to generate a specific robotic control plan 124 that allows the robotic control system 150 to control the robotic components 170a-n in the execution environment 170 in order to execute the required robotic task within the required timing constraints.

Template Robotic Control Plans

In some implementations, the planner generates the specific robotic control plan 124 using a template robotic control plan 162 that is configurable for multiple different robotics applications.

For example, the template robotic control plan 162 can be configurable for multiple different robotic tasks. The multiple tasks can each be a member of the same class of tasks, e.g., "insertion tasks." In this example, the template robotic control plan 162 can be configured to perform insertions of different types of hardware, e.g., insertion of an HDMI cable, insertion of a USB cable, insertion into a wall socket, and so on. The class of tasks can be in any appropriate domain, e.g., classes of medical robotics tasks (e.g., robotic surgery, medical imaging, etc.), manufacturing robotics tasks, autonomous vehicle tasks (e.g., maneuvering of an autonomous agent in a warehouse), and so on. The planner 120 can process the template robotic control plan 162 to generate a specific robotic control plan 124 that executes the specific required robotic task of the robotic control system 150.

Instead or in addition, the template robotic control plan 162 can be configurable for multiple different execution environments. The multiple different execution environments can have different dimensions, different obstructions within the environment, a different configuration of robotic components or other objects within the environment, and so on. In some implementations, the template robotic control plan 162 can be configured for a new robotic operating environment, i.e., an environment for which the system 100 has not generated a robotic control plan before. For example, the new robotic operating environment can have differences in lighting, available equipment, available sensors, and so on compared to other robotic operative environments for which the system 100 has generated a robotic control plan. In some implementations, the template robotic control plan 162 can be configured for a "temporary" robotic operating environment, i.e., an environment in which the robotic components 170a-n will complete only one or a few tasks. For example, the template robotic control plan 162 can be configured for a robotic operating environment in a user's home. The planner can process the robotic control plan 162 to generate a specific robotic control plan 124 that is configured to be executed in the specific execution environment 170.

Instead or in addition, the template robotic control plan 162 can be configurable for multiple different sets of robotic components 170a-n. The multiple different sets of robotic components 170a-n can include any appropriate type of robotic components, e.g., one or more robotic arms, one or more sensors (e.g., cameras, LIDAR sensors, microphones, etc.), and so on. The planner can process the robotic control plan 162 to generate a specific robotic control plan 124 that is configured to be executed by the specific robotic components 170a-n.

Instead or in addition, the template robotic control plan 162 can be configurable for multiple different sets of execution constraints. The sets can include any appropriate constraints on the execution of a robotic control plan, e.g., constraints imposed by a robot safety standard to which the robotic control system 150 adheres. The planner can process the robotic control plan 162 to generate a specific robotic control plan 124 that is configured to execute according to the specific constraints of the robotic control system 150.

The template robotic control plan 162 can be designed by a first user or entity, who defines the family of robotics applications for which the template robotic control plan 162 can be configured, and a procedure by which the template robotic control plan 162 can be configured for a specific robotic application. The template robotic control plan 162 can then be used by one or more second users or entities for different respective specific robotics applications.

The planner 120 can obtain the template robotic control plan 162 from the plan database 160, which can be configured to store one or more template robotic control plans. In some implementations, the plan database 160 is hosted by the same entity as the system 100. In a particular example, the plan database is a component of the planner 120. In some other implementations, the plan database 160 is hosted by a different entity than the other components of the system 100. For example, the plan database 160 can be maintained by an individual or corporation that provides template robotic control plans to users, who then configure the template robotic control plans for their specific use case.

In some other implementations, the planner 120 can obtain the template robotic control plan 162 from the user system 140. In these implementations, the user system 140 can correspond to the same user or entity that designed the template robotic control plan 162, or a different user or entity.

The template robotic control plan 162 can define one or more open parameters that parameterize the multiple different robotics applications for which the template robotic control plan 162 can be configured. By determining a specific set of values for the open parameters, the planner 120 can configure the template robotic control plan 162 into the specific robotic control plan 124. In this specification, a parameter of a template robotic control plan is an open parameter if the value that the parameter will take in specific robotic control plans generated from the template robotic control plan is not predetermined.

The one or more open parameters of the template robotic control plan 162 can include (i) one or more user-determined open parameters, (ii) one or more planner-determined open parameters, or (iii) both. A user-determined open parameter is an open parameter identified by the template robotic control plan 162 whose value is to be determined by a user of the planner 120. A planner-determined open parameter is an open parameter identified by the template robotic control plan 162 whose value is to be determined by the planner 120. In some implementations, one or more of the open parameters of the template robotic control plan 162 can be either user-determined or planner-determined. For example, for each such open parameter, a user of the planner 120 can decide either to provide a value for the open parameter or to allow the planner 120 to determine a value for the particular open parameter.

The template robotic control plan 162 can define one or more configuration procedures for configuring the template robotic control plan 162 to a particular robotics application, e.g., one or more procedures for determining values for the planner-determined open parameters of the template robotic control plan 162. For example, the template robotic control plan 162 can define one or more machine learning procedures for determining values for one or more planner-determined open parameters, e.g., one or more reinforcement learning procedures, one or more learning-from-demonstration procedures, and so on. In implementations in which the template robotic control plan 162 are configurable using machine learning procedures, the template robotic control plan 162 is a learnable robotic control plan. Learnable robotic control plans, and techniques for executing the machine learning procedures defined by learnable robotic control plans, are discussed in more detail below. As another example, the template robotic control plan 162 can define an optimization procedure, e.g., an optimization procedure that is not machine learned, for generating values for one or more planner-determined open parameters using one or more user-determined open parameters. That is, the optimization procedure can be defined to receive as input values for the user-determined open parameters and to generate as output values for the planner-determined open parameters.

In some implementations, the one or more configuration procedures of the template robotic control plan 162 are predetermined; that is, the planner 120 executes each of the configuration procedures to generate the specific robotic control plan 124. In some other implementations, a selection of one or more particular configuration procedures from a set of multiple configuration procedures can itself be an open parameter of the template robotic control plan 162. The planner 120 can then use the one or more particular configuration procedures to determine values for one or more other open parameters of the template. As a particular example, the selection of one or more particular configuration procedures can be a user-determined open parameter.

In some implementations, the template robotic control plan 162 defines a state machine that is configurable for the multiple robotics applications according to the open parameters of the template robotic control plan 162. The configured state machine can then be executed by the robotic control system 150. That is, the robotic control system 150 can use the configured state machine to drive the movements of the robotic components 170*a-n*.

In this specification, a state machine is a representation of the operations to be performed by a robotic component. A state machine includes multiple states and transitions. Each state of the state machine corresponds to a particular state of the execution environment in which the robotic component is executing, and represents a set of operations to be executed by the robotic component when the execution environment is in the particular state. Each transition between a first state and a second state of the state machine represents one or more "exit conditions" that, if satisfied, cause the robotic component to transition from executing the operations represented by the first state to executing the operations represented by the second state. State machines are discussed in more detail below with reference to FIG. 2.

To determine values for the user-determined open parameters of the template robotic control plan 162, the planner 120 can obtain a user input 142 from the user system 140. For example, for each user-determined open parameter, the planner 120 can provide a prompt to the user of the user system 140, and in response the user can provide a value or range of values for the parameter.

In some implementations, the user system 140 is local to the planner 120, e.g., the planner 120 and the user system 140 can both be components of a user device of the user. In some other implementations, the planner 120 is remote to the user system 140, e.g., the user system 140 can be a component of a user device of the user while the planner 120 is hosted by a cloud system.

The user system 140 can prompt the user to provide the user input 142 using any appropriate user interface, e.g., a command line interface or a graphical user interface. The user can provide responses to the prompts of the user system 140 in any appropriate way, e.g., by provided a text input using a keyboard, by selecting one or more display options using a computer mouse, by providing a voice input using a microphone, and so on.

For example, the interface can guide the user through a sequence of prompts each corresponding to a respective open parameter of the template robotic control plan 162. In some implementations, the user system 140 can use the response of the user to one or more earlier prompts in the sequence of prompts to determine one or more subsequent prompts in the sequence of prompts; that is, the sequence of prompts can be reactive to the responses provided by the user. For instance, the sequence of prompts can be defined by a decision tree.

As a particular example, the first prompt in the sequence of prompts can request the user to select one or more particular configuration procedures, from a set of multiple configuration procedures, for configuring the template robotic control plan 162. The user system 140 can then use subsequent prompts in the sequence of prompts to parameterize the one or more selected configuration procedures.

In some implementations, the user interface of the user system 140 is simple enough to allow a non-expert user to respond to the prompts for generating the user input 142. That is, the template robotic control plan 162 can be designed so that it can be configured using only information that can be provided by a non-expert user, e.g., a user who does not necessarily have a background in robotics or engineering. For example, the designer of the template robotic control plan 162 can expose only a small set of human-interpretable open parameters to the user, and define configuration procedures to allow the specific robotic control plan 124 to be generating using only values for the small set of human-interpretable open parameters. In some such implementations, the user of the user system 140 is unaware of the details of the underlying configuration procedures, or even that the configuration procedures are being executed at all.

The user-determined open parameters of the template robotic control plan 162 can include any appropriate types of parameters of a robotics application.

As a particular example, in implementations in which the template robotic control plan 162 is configurable for multiple different robotic tasks, the user input 142 can include data characterizing the required robotic task. For example, the user input 142 can identify one or more of: the required task selected from a list of tasks for which the template robotic control plan 162 is configurable; a set of parameters of the required task (e.g., parameters of a product to be assembled if the required task is an assembly task, a destination or distance to be travelled if the required task is an autonomous vehicle task, and so on); or a set of one or more success criteria that define whether the required task has been successfully completed (e.g., the success criteria can include confirming whether an object has achieved a desired state or pose, or whether an electric signal has been detected through an electrical cable if the required task is an insertion task).

As another particular example, in implementations in which the template robotic control plan 162 is configurable for multiple different sets of robotic components 170*a-n*, the user input 142 can include data characterizing the robotic components 170*a-n* that are available in the execution environment 170. For example, for each robotic component 170*a-n*, the user input 142 can identify one or more of: a type of the robotic component (e.g., by identifying a manufacturer, a model number, and so on); a set of capabilities of the robotic component (e.g., a set of skill functions or libraries that the robotic component can execute); or a set of requirements of the robotic component (e.g., power requirements, timing requirements, and so on).

As another particular example, in implementations in which the template robotic control plan 162 is configurable for multiple different execution environments, the user input 142 can include data characterizing the current state of the execution environment 170. For example, the user input 142 can include one or more of: one or more images of the execution environment 170 (e.g., RGB images captured by a camera in the environment 170, LIDAR images captured by a LIDAR sensor in the environment 170, and so on); a three-dimension virtual model of the execution environment 170; or a respective location and pose for each of one or more objects in the environment 170 (e.g., the robotic components 170*a-n*, one or more assembly components to be assembled together if the robotic task is an assembly task, and so on). For instance, the user system 140 can display an image of the execution environment 170 to the user, and the user can identify (e.g., by using a computer mouse to click on the image) the location of one or more "targets" of the robotic task, e.g., the location of an electrical cable and the location of a wall socket if the robotic task is an insertion task.

As another particular example, in implementations in which the template robotic control plan 162 is configurable for multiple different sets of execution constraints, the user input 142 can identify one or more of: a particular safety standard to be followed; one or more real-time timing requirements of the robotic control system 150 if the system 150 is a real-time control system; a required time in which the task should be completed; or allowable or required ranges of values for parameters of the robotic components 170*a-n* during the execution of the required task (e.g., allowable ranges for velocity, torque, and so on).

After obtaining the user input 142 from the user system 140, the planner 120 can process the user input 142 to identify values for the user-determined open parameters of the template robotic control plan 162. In some implementations, one or more user-determined open parameters can have "default" values. If the user input 142 does not specify a value for a user-determined open parameter, then the user-determined open parameter takes the default value in the specific robotic control plan 124.

In some implementations, the user input 142 can be provided in the form of a configuration file. In some implementations, as described above, some or all of the configuration file can be generated by the user system 140 using prompts provided to a user of the user system 140. Instead or in addition, some or all of the configuration file can be generated directly by the user. Instead or in addition, some or all of the configuration file can be provided by a manufacturer of one or more of the robotic components 170*a-n*. For example, in implementations in which the template robotic control plan 162 is configurable for multiple different sets of robotic components, the manufacturer of the robotic components can provide data identifying parameters of the robotic components, and this data can be included in the configuration file.

The planner 120 can execute, according to the user-determined open parameters, the configuration procedures of the template robotic control plan 162 to generate the specific robotic control plan 124. As described above, in some implementations, the template robotic control plan 162 is a learnable robotic control plan; that is, one or more of the configuration procedures of the template robotic control plan 162 can be a machine learning procedure. For example, one or more of the planner-determined open parameters of the template robotic control plan 162 can be learnable parameters, i.e., parameters whose value is to be determined using a machine learning procedure.

Learnable Robotic Control Plans

In some implementations, the planner generates the specific robotic control plan 124 using a learnable robotic control plan 164 that defines one or more machine learning procedures for generating respective values for one or more learnable parameters of the learnable robotic control plan 164. In some implementations, the learnable robotic control plan 164 is the template robotic control plan 162 described above. In some other implementations, the learnable robotic control plan 164 is not a template robotic control plan, i.e., is designed for a single robotic application whose execution can be improved using the machine learning procedures.

The learnable robotic control plan 164 can be designed by a first user or entity and subsequently obtained by one or more second users or entities, who execute the machine learning procedures to generate specific robotic control plans that include trained values for each of the learnable parameters.

In some implementations, the designer of the learnable robotic control plan 164 used an application programming interface (API) to define the machine learning procedures within the learnable robotic control plan 164. That is, the API can provide tools to the designer to import machine learning capabilities into a robotic control plan. The API can be configured so that the machine learning procedures can be inserted into the robotic control plan "out-of-the-box", i.e., without requiring significant additional engineering to allow the machine learning procedures to be compatible with the robotic control plan.

For example, the API can allow the designer to import one or more third-party machine learning libraries into an existing robotic control plan. The API can support multiple different third-party libraries; in some implementations, the API can be configured to support "new" third-party libraries with which the API has not interacted before (e.g., third-party libraries that the designers of the API did not explicitly designate as "supported" by the API). For example, the API can define one or more conditions, and if a third-party library satisfies the conditions then the third-party library can be imported using the API. For example, the API can define an interface for providing input data, e.g., supervised training data, to a machine learning library and subsequently obtaining output data, e.g., trained values for the learnable parameters, from the machine learning library, such that the interface can be configured to interact with any machine learning library.

The API can be flexible to a wide range of different machine learning models, e.g., neural networks, support vector machines, and so on, allowing the designer of the learnable robotic control plan 164 to select, for each machine learning procedure defined by the learnable robotic control plan 164, a model that is appropriate for learning values for the learnable parameters of the procedure.

As a particular example, the learnable robotic control plan 164 can define a state machine that includes multiple states corresponding to respective states of the execution environment 170. The API can enable to designer of the learnable robotic control plan 164 to identify one or more states of the state machine as "learnable," e.g., by inserting a single tag or expression into the computer-language code that defines the learnable state. For each learnable state of the state machine, the designer can then define the learnable parameters of the state and the one or more machine learning procedures for generating values for the learnable parameters. This process is discussed in more detail below with reference to FIG. 2.

The designer of a learnable robotic control plan 164 (or a template robotic control plan 162) can be any appropriate entity, e.g., a manufacturer of the robotic components 170a-n, a site operator of the execution environment 170, a third-party developer, and so on.

The planner 120 can obtain the learnable robotic control plan 164 from the plan database 160, which can be configured to store one or more learnable robotic control plans. As described above, the plan database 160 can hosted by the same entity or by a different entity than the other components of the system 100. For example, the plan database 160 can be maintained by an individual or corporation that provides learnable robotic control plans to users, who then execute the machine learning procedures of the learnable robotic control plans for their specific use case.

In some other implementations, the planner 120 can obtain the learnable robotic control plan 164 from the user system 140. In these implementations, the user system 140 can correspond to the same user or entity that designed the learnable robotic control plan 164, or a different user or entity.

To execute the one or more machine learning procedures of the learnable robotic control plan 164, the planner 120 can submit a request 122 to the training system 130. The training system 130 is configured to execute each machine learning procedure to generate learned values for the learnable parameters corresponding to the machine learning procedure.

The machine learning procedures of the learnable robotic control plan 164 can incorporate any appropriate machine learning architectures and techniques.

For example, at least one of the machine learning procedures of the learnable robotic control plan 164 can be a reinforcement learning procedure. Reinforcement learning is a category of machine learning wherein an agent (here, the robotic components 170a-n) learns how to operate within an environment (here, the execution environment 170) by taking actions within the environment and receiving feedback, often called a "reward", from the environment in response to the actions.

To execute a reinforcement learning procedure, the training system 130 can instruct the robotic components 170a-n to take actions within the execution environment by submitting commands 132 to the robotic components 170. That is, the training system 130 can be communicatively connected to the execution environment 170, allowing the training system 130 to submit the commands 132 to drive the movements of the robotic components 170a-n, similar to how the robotic control system 150 is configured to control the robotic components 170a-n using the commands 152. In some implementations, the training system 130 is a component of the robotic control system 150.

In some implementations, the reinforcement learning procedure defines a predetermined sequence of robotic operations for the robotic components 170a-n, and the goal of the reinforcement learning procedure is to improve the execution of the robotic operations to accomplish the required robotic task. For example, the predetermined sequence of robotic operations can be designed to accomplish the robotic task under "ideal" conditions, e.g., in a particular execution environment that is different from the execution environment 170, or by a set of robotic components that are different from the robotic components 170a-n. Then, the training system 130 can execute the reinforcement learning procedure to improve the execution of the robotic operations specifically in the execution environment 170 by the robotic components 170a-n.

While the training system 130 is controlling the robotic components 170a-n during the reinforcement learning procedure, the training system 130 can obtain execution data 172 from the execution environment 170. The execution data 170 characterizes the state of the execution environment 170 during the execution of the commands 132. For example, the execution data 172 can include a respective pose for each of the robotic components 170a-n and/or one or more other objects in the execution environment 170 (e.g., electrical cables if the robotic task is an insertion task, assembly components if the robotic task is an assembly task, and so on) at a particular time point during the execution of the reinforcement learning procedure.

From the execution data 172, the training system can determine rewards for the actions of the robotic components 170a-n (i.e., the actions driven by the commands 132), and use the determined rewards to update the learnable parameters corresponding to the reinforcement learning procedure. In particular, the reinforcement learning procedure can define a reward function that receives as input the execution data 172 (or an input generated from the execution data 172) and generates a reward as output. Generally, the determined reward is indicative of the extent to which the robotic task has been accomplished. The training system 130 can use any appropriate technique to update the learnable parameters using the determined reward; for example, if the reinforcement learning procedure is parameterized (at least in part) by a neural network, then the training system 130 can perform backpropagation and gradient descent to update the network parameters of the neural network.

As another example, at least one of the machine learning procedures of the learnable robotic control plan 164 can be a learning-from-demonstration procedure. Learning-from-demonstration is a technique whereby a user of a robotic component physically demonstrates a robotic task to be performed by the robotic component, and the robotic component learns from the physical demonstration how to perform the robotic task independently. For example, a user can physically manipulate the robotic component to demonstrate the movements that should be executed by the robotic component, and the robotic component learns to repeat the movements. In particular, one or more users physically in the execution environment 170 can manipulate one or more of the robotic components 170a-n, which can then send execution data 172 to the training system 130. The execution data 172 can characterize the movements demonstrated by the users. The training system 130 can then process the execution data to generate the commands 152 that can be issued to the robotic components 170a-n to cause them to repeat the movements.

As another example, at least one of the machine learning procedures of the learnable robotic control plan 164 can be a supervised learning procedure. The training system 130 can obtain a labeled training data set that includes multiple training examples that each include (i) a training input to the supervised learning model and (ii) a label that identifies a ground-truth output that the supervised learning model should generated in response to processing the training input. For example, each training input can represent a respective different configuration for the execution environment 170, and the supervised learning model can be configured to generate a model output that identifies one or more parameters for the execution of the specific robotic control plan 124. In some implementations, the training data set can be generated by demonstration by a user, as described above. That is, the user can demonstrate the execution of the robotic task in a particular configuration of the execution environment 170, and parameters of the execution can be recorded as the ground-truth output for the supervised learning model given the particular configuration as a training input. As an illustrative example, if the robotic task is a surface polishing or sanding task, then the training system 130 can record (i) local geometry information for the surface (e.g., local curvature of the surface) as the training input and (ii) the force, angle, and so on with which a user sanded the surface as the ground-truth output. The training system 130 can use an error between (i) the ground-truth output for a training input and (ii) the output generated by the supervised learning model in response to processing the training input to update the parameters of the supervised learning procedure; for example, if the supervised learning model is a neural network, then the training system 130 can update the parameters using backpropagation and gradient descent.

After executing the machine learning procedures of the learnable robotic control plan 164 in response to the request 122, the training system 130 can provide the learned values 134 for the learnable parameters of the machine learning procedures to the planner 120.

In some implementations, each of the one or more machine learning procedures of the learnable robotic control plan 164 are required; that is, the planner 120 executes each of the machine learning procedures to generate the specific robotic control plan 124. In some other implementations, some or all of the machine learning procedures of the learnable robotic control plan 164 can be optional; that is, the planner 120 or a user of the system 100 can determine whether or not to execute the optional machine learning procedures. For example, the user system 140 can submit a user input 142 identifying which of the optional machine learning procedures should be executed when generating the specific robotic control plan 124. As a particular example, in implementations in which the learnable robotic control plan 164 is a template robotic control plan, the user can select one or more particular configuration procedures from a set of configuration procedures of the template robotic control plan, as described above, where the set includes one or more machine learning procedures.

In cases where an optional machine learning procedure is not execute, the learnable robotic control plan 164 can identify default values for the learnable parameters corresponding to the optional machine learning procedure. That is, because the optional machine learning procedure is not executed, learned values for the learnable parameters corresponding to the optional machine learning procedure will not be determined. Thus, the specific robotic control plan 124 can include the default values for these learnable parameters.

In some implementations, during a first phase of the execution of the specific robotic control plan 124, the robotic control system 150 can execute the specific robotic control plan 124 according to the default values for the learnable parameters corresponding to a particular machine learning procedure. During the first phase of the execution, or after the end of the first phase of the execution, the planner 120 can execute the particular machine learning procedure to generate learned values for the corresponding learnable parameters, and update the specific control plan 124 to include the learned values. Then, during a second phase of the execution, the robotic control system 150 can execute the specific robotic control plan 124 according to the learned values of the learnable parameters.

For example, the first phase of the execution can include executing only a portion of the specific robotic control plan 124 (e.g., a portion of the specific robotic control plan 124 that does not use the learnable parameters corresponding to the particular machine learning procedure) and the second phase of the execution can include executing the remainder of the specific robotic control plan 124 (e.g., including the portion of the specific robotic control plan 124 that uses the learnable parameters corresponding to the particular machine learning procedure. Thus, in the first phase, the performance of the robotic components 170*a-n* in the required robotic task can be unaffected by the fact that learned values for the learnable parameters have not yet been generated, because the learnable parameters are not required for the first phase. As another example, the first phase of the execution can include executing the specific robotic control plan 124 one or more times, and the second phase of the execution can include executing the specific robotic control plan 124 one or more additional times.

In some implementations, the planner 120 (or robotic control system 150) can determine to switch from the first phase of the execution to the second phase of the execution when one or more criteria have been met. For example, the planner 120 can determine to switch from the first phase to the second phase when the performance of the specific robotic control plan 124, when executed according to the learned values of the learnable parameters, exceeds the performance of the specific robotic control plan 124 when executed according to the default values of the learnable parameters. As a particular example, the planner 120 can obtain from the training system 130 a measure of the training performance of the learned values for the learnable parameters (e.g., a training loss or training accuracy of the machine learning procedure corresponding to the learnable parameters), and compare the measure of the training performance with a measure of the current performance of the specific robotic control plan 124 executed by the robotic control system 150 using the default values for the learnable parameters.

For example, the learnable robotic control plan 164 can define a metric by which the execution of specific robotic control plan 124 is to be measured; e.g., insertion success rate if the robotic task is an insertion task or surface roughness if the robotic task is a surface polishing task. The metric can be defined to be the average performance of the specific robotic control plan 124 across multiple executions, e.g., across ten, a hundred, a thousand, or a million executions. In some implementations, the multiple different executions can each have different initial configurations. In some implementations, the metric can depend on the time required to execute the specific robotic control plan 124, e.g., where the performance is considered improved if the time required to execute the plan 124 is lower.

In some implementations, the metric for determining the training performance of the learned values for the learnable parameters and the metric for determining the current performance of the execution of the specific robotic control plan 124 are the same, and can be compared directly. In some other implementations, the two metrics are different, and the planner 120 can translate one to the other, e.g., using a predetermined relationship between the two metrics, in order to directly compare the two.

In some implementations, the learnable robotic control plan 164 can be used to generate a specific robotic control plan 124 by a non-expert user, e.g., a user who does not necessarily have a background in robotics or machine learning. For example, the planner 120 can automatically invoke the machine learning procedures without requiring any input from the user. In some such implementations, the user can be unaware of the details of the machine learning procedures, or even that the machine learning procedures are being executed at all.

As described above, after generating the specific robotic control plan 124 from the learnable robotic control plan 164, the planner 120 can provide the specific robotic control plan 124 to the robotic control system 150, which executes the specific robotic control plan 124 by issuing commands 152 to the execution environment 170 in order to drive the movements of the robotic components 170*a-n*. In particular, the robotic control system 150 can execute the specific robotic control plan 124 without performing any additional machine learning procedures, as if the robotic control system 150 were executing a robotic control plan that did not include any learnable parameters. In this way, the efficiency of the robotic control system 150 (e.g., the computational, time, and/or memory efficiency) when executing a robotic control plan that includes learned parameters can be the same, or better, than its efficiency when executing a robotic control plan that does not include learnable parameters. In other words, the improved performance of using machine-learned values for the learnable parameters does not come at the cost of lowered efficiency.

Figure 2:
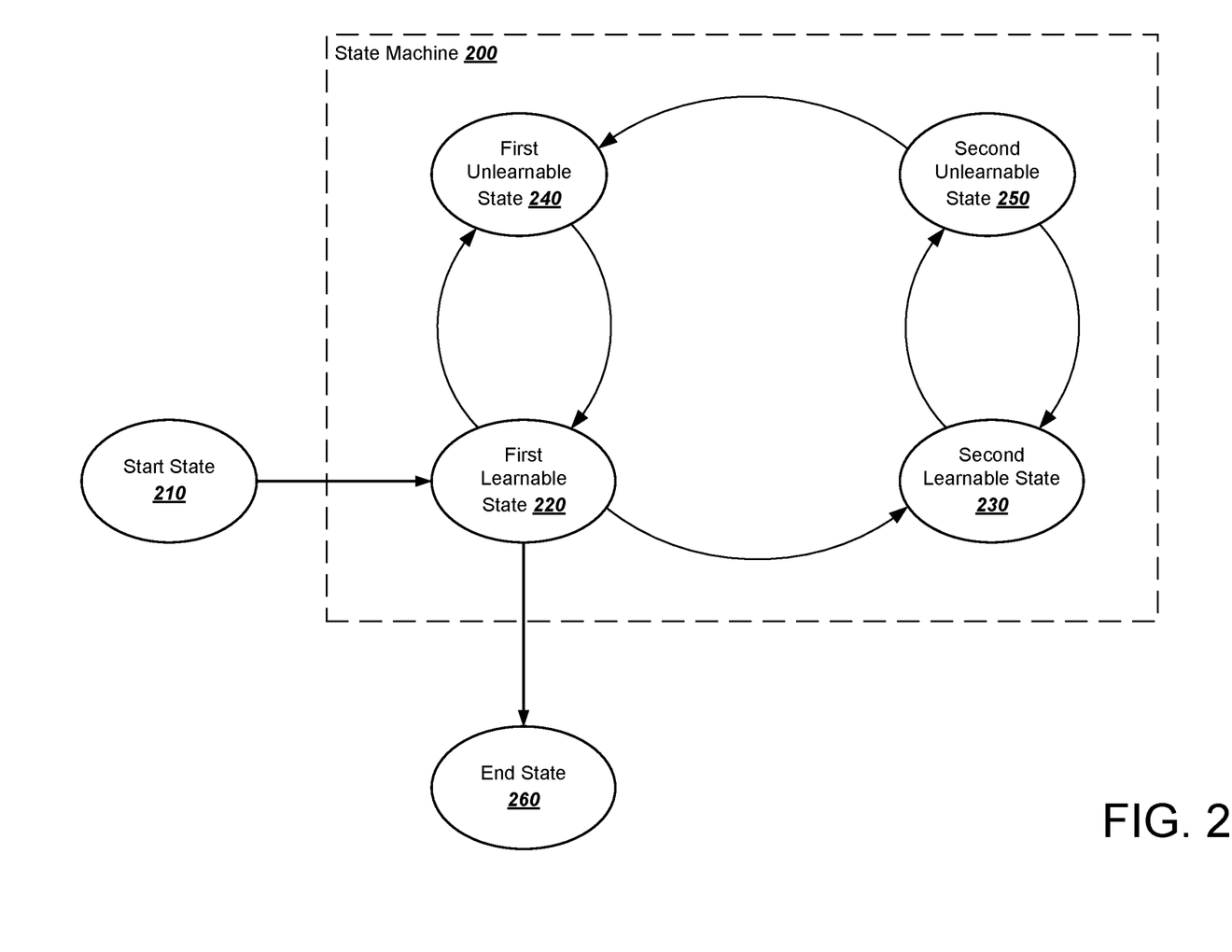
FIG. 2 illustrates an example state machine of a learnable robotic control plan.

FIG. 2 illustrates an example state machine 200 of a learnable robotic control plan.

The state machine 200 defines multiple states each corresponding to a respective state of an execution environment (e.g., the execution environment 170 illustrated in FIG. 1) in which the learnable robotic control plan is to be executed. In particular, the state machine 200 defines a start state 210 representing the state of the execution environment before the execution of the learnable robotic control plan, four states 220, 230, 240, and 250 that represent respective states of the execution environment during the execution of the learnable robotic control plan, and an end state 260 representing the state of the execution environment after the completion of the learnable robotic control plan. For convenience, the four states 220, 230, 240, and 250 that represent states of the execution environment during the execution of the learnable robotic control plan are called "execution" states of the state machine 200. Although only four execution states are illustrated in FIG. 2, generally a state machine can have many more execution states, e.g., hundreds or thousands of execution states.

In some implementations, the state machine 200 can be defined by a configuration file of the learnable robotic control plan. As described in more detail below, the state machine 200 can define one or more machine learning procedures, which can be executed by a planner, (e.g., the planner 120 illustrated in FIG. 1) to update the state machine 200, i.e., to update the configuration file that defines the state machine 200.

A robotic control system (e.g., the robotic control system 150 illustrated in FIG. 1) can execute the learnable robotic control plan to cause one or more robotic components (e.g., the robotic components 170*a-n* illustrated in FIG. 1) in the execution environment to accomplish a robotic task. During the execution of the learnable robotic control plan, the robotic control system can drive the movements of the robotic components according to the execution state 420, 430, 440, or 450 corresponding to the current state of the execution environment.

The state machine 200 includes transitions, represented by arrows, between the states of the state machine 200. Each transition between a first state and a second state of the state machine 200 represents one or more "exit conditions" that indicate that the execution environment has transitioned from being in the state represented by the first state of the state machine 200 to being in the state represented by the second state of the state machine 200. While the robotic control system is executing the operations of a first execution state 420, 430, 440, or 450, the robotic control system can determine that the exit conditions for a transition from the first execution state to a second execution state have been satisfied. In response to determining that the exit conditions have been satisfies, the robotic control system can follow the transition to the second execution state, i.e., stop executing the operations of the first execution state and begin executing the operations of the second execution state.

One or more of the execution states of the state machine 200 are be "learnable" states, i.e., can define one or more learnable parameters and one or more machine learning procedures for generating values for the learnable parameters. In some implementations, each execution state of the state machine 200 is a learnable state. In some other implementations (as illustrated in FIG. 2), one or more of execution states of the state machine 200 are "unlearnable" states, i.e., do not define any learnable parameters. That is, each parameter of the unlearnable states has a predetermined value that is not to be machine-learned. In particular, the execution states 220 and 230 are learnable states, and the execution states 240 and 250 are unlearnable states.

In other words, the values of the parameters of the unlearnable states 240 and 250 are invariant to differences in the robotic execution environment, such that the execution of the operations defined by the unlearnable states 240 and 250 is the same in any robotic execution environment. For example, the unlearnable states 240 and 250 can define simple robotic movements whose parameter values can be predetermined without information about the execution environment. The operations of the unlearnable states 240 and 250 can still require sensor input characterizing the current state of the execution environment, but are invariant to different execution environments such that, given the sensor input, the operations are executed deterministically, without learning values for any parameters.

In some implementations, as described above, the designer of the state machine 200 can use an API to define the learnable states 220 and 230, including defining the learnable parameters and the machine learning procedures. For example, the API can be configured to enable the designer to declare an execution state to be a learnable state using a single expression, e.g., "state.Learnable( )". As another example, the API can provide a graphical user interface (GUI) that allows the designer to configure the state machine 200, e.g., by dragging and dropping icons that represent new states of the state machine.

As a particular example, the designer of the state machine 200 can determine to define a reinforcement learning procedure for determining values for learnable parameters of the first learnable state 220. To do so, the designer can use the API to import a third-party reinforcement learning library into the learnable robotic control plan. Similarly, if the designer determines to define a learning-from-demonstration procedure for determining values for learnable parameters of the second learnable state 230, then the designer can import a third-party learning-from-demonstration library into the learnable robotic control plan.

Figure 3:
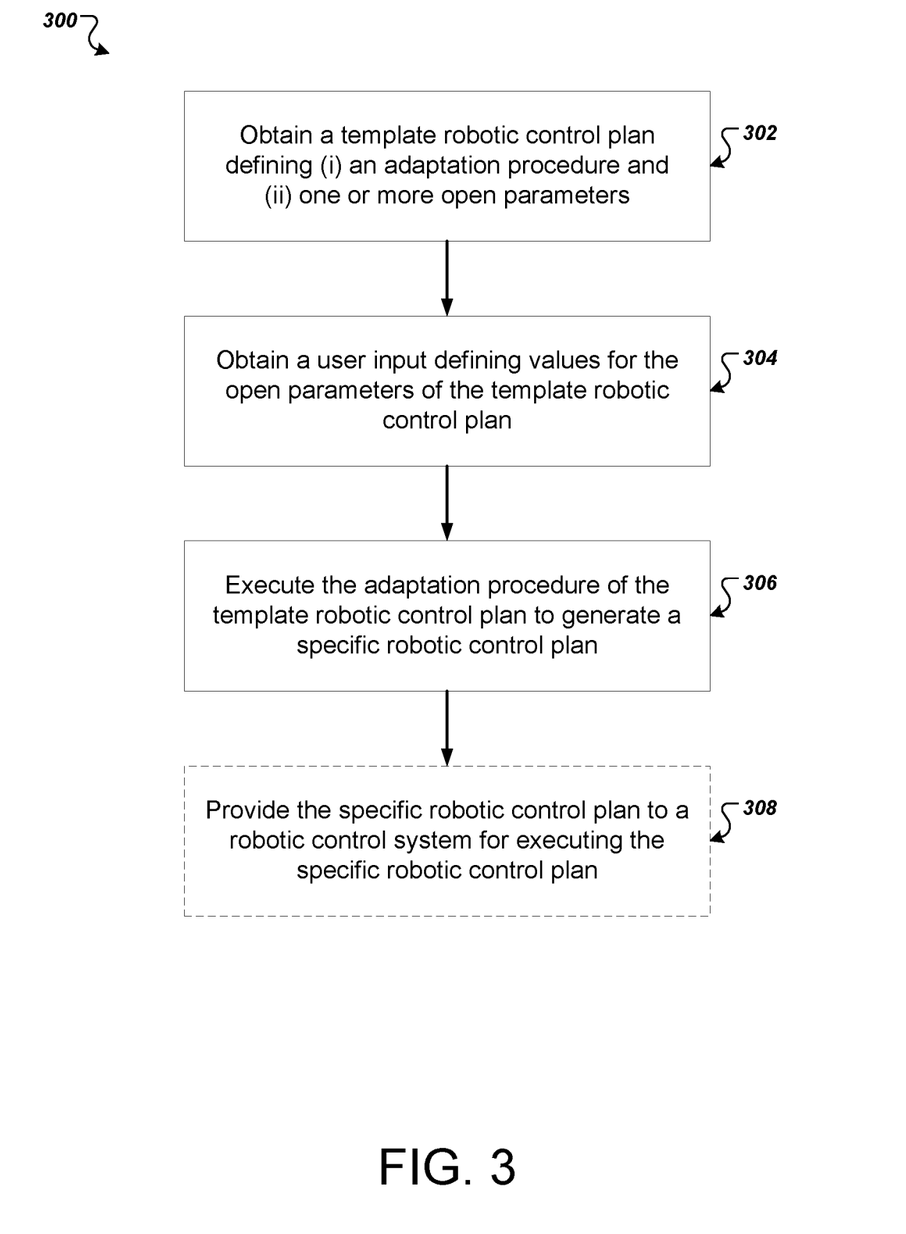
FIG. 3 is a flowchart of an example process for generating a specific robotic control plan from a template robotic control plan.

FIG. 3 is a flowchart of an example process 300 for generating a specific robotic control plan from a template robotic control plan. The process 300 can be implemented by one or more computer programs installed on one or more computers and programmed in accordance with this specification. For convenience, the process 300 will be described as being performed by a system of one or more computers. For example, the process 300 can be performed by the system 100 depicted in FIG. 1.

The system obtains the template robotic control plan (step 302). The template robotic control plan is configurable for multiple different robotics applications, e.g., multiple different robotic tasks, multiple different robotic execution environments, multiple different sets of robotic components, and/or multiple different sets of execution constraints. The template robotic control plan includes data defining (i) an adaptation procedure and (ii) a set of one or more open parameters.

For example, the open parameters can include one or more of: one or more parameters characterizing an execution environment in which the specific robotic control plan will be executed; an identification of one or more success criteria for the specific robotic control plan; an identification of one or more robotic components that will execute the robotic control plan; an identification of one or more objects in the specific robotic execution environment; a location of one or more robotic components in the specific robotic execution environment; a location of one or more objects in the specific robotic execution environment; or one or more parameters characterizing execution constraints on the specific robotic control plan.

The system obtains a user input that defines a respective value or range of values for each open parameter in the set of open parameters (step 304). The user input characterizes a specific robotics application for which the template robotic control plan can be configured. In some implementations, the template robotic control plan defines a set of multiple different adaptation procedures, and the user input identifies a particular adaptation procedure from the set of multiple different adaptation procedures.

In some implementations, the template robotic control plan defines a default value for a particular open parameter in the set of open parameters. If the user input does not explicitly identify a value or range of values for the particular open parameter, then the system can determine to use the default value for the particular open parameter in the specific robotic control plan.

The system executes, using the obtained values for the set of open parameters, the adaptation procedure to generate the specific robotic control plan from the template robotic control plan (step 306).

In some implementations, the template robotic control plan defines both user-determined open parameters and planner-determined open parameters. The user input can define values for the user-determined open parameters, and executing the adaptation procedure can include determining values for the planner-determined open parameters.

Optionally, the system provides the specific robotic control plan to a robotic control system for executing the specific robotic control plan (step 308).

Figure 4:
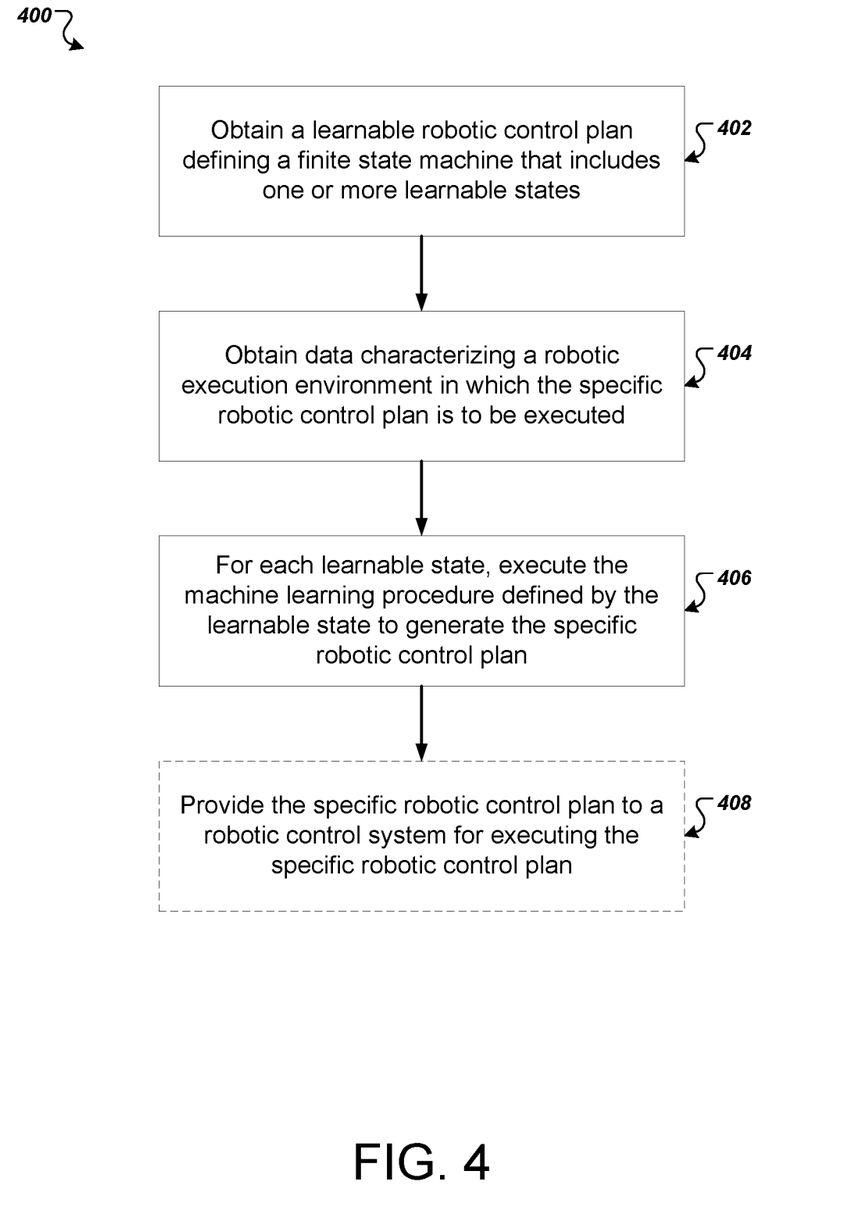
FIG. 4 is a flowchart of an example process for generating a specific robotic control plan from a learnable robotic control plan.

FIG. 4 is a flowchart of an example process 400 for generating a specific robotic control plan from a learnable robotic control plan. The process 400 can be implemented by one or more computer programs installed on one or more computers and programmed in accordance with this specification. For convenience, the process 400 will be described as being performed by a system of one or more computers. For example, the process 400 can be performed by the system 100 depicted in FIG. 1.

The system obtains the learnable robotic control plan (step 402). The learnable robotic control plan includes data defining a state machine that includes multiple state and multiple transitions between states, where one or more of the states are learnable states. Each learnable state can include data defining (i) one or more learnable parameters of the learnable state and (ii) a machine learning procedure for automatically learning a respective value for each learnable parameter of the learnable state. The system can process the learnable robotic control plan to generate the specific robotic control plan.

The state machine can also include one or more unlearnable states that can be executed by a robotic control system without a machine learning procedure.

The system obtains data characterizing a robotic execution environment in which the specific robotic control plan is to be executed (step 404).

For each learnable state of the state machine, the system executes, using the obtained data characterizing the robotic execution environment, the machine learning procedure defined by the learnable state to generate the specific robotic control plan (step 406). In particular, for each learnable state, executing the machine learning procedure defined by the learnable state generates a respective value for each learnable parameter of the learnable state.

Optionally, the system provides the specific robotic control plan to a robotic control system for executing the specific robotic control plan (step 308).

In some implementations, a particular learnable state of the state machine can define default values for the learnable parameters of the particular learnable state. In these implementations, during a first phase of the execution of the specific robotic control plan, the system can execute a first version of the specific robotic control plan according to the default values for the learnable parameters of the particular learnable state. The system can then determine that the machine learning procedure of the particular learnable state has satisfied one or more conditions, e.g., that a training loss or a training accuracy of the machine learning procedure satisfies a threshold. In response, during a second phase of the execution of the specific robotic control plan, the system can execute a second version of the specific robotic control plan according to the generated values of the learnable parameters of the particular learnable state.

The robot functionalities described in this specification can be implemented by robotic control system (e.g., the robotic control system 150 depicted in FIG. 1) that includes a hardware-agnostic software stack, or, for brevity just a software stack, that is at least partially hardware-agnostic. In other words, the software stack can accept as input commands generated by the planning processes described above without requiring the commands to relate specifically to a particular model of robot or to a particular robotic component. For example, the software stack can be implemented at least partially by the real-time robotic control system 150 of FIG. 1.

The software stack can include multiple levels of increasing hardware specificity in one direction and increasing software abstraction in the other direction. At the lowest level of the software stack are robot components that include devices that carry out low-level actions and sensors that report low-level statuses. For example, robots can include a variety of low-level components including motors, encoders, cameras, drivers, grippers, application-specific sensors, linear or rotary position sensors, and other peripheral devices. As one example, a motor can receive a command indicating an amount of torque that should be applied. In response to receiving the command, the motor can report a current position of a joint of the robot, e.g., using an encoder, to a higher level of the software stack.

Each next highest level in the software stack can implement an interface that supports multiple different underlying implementations. In general, each interface between levels provides status messages from the lower level to the upper level and provides commands from the upper level to the lower level.

Typically, the commands and status messages are generated cyclically during each control cycle, e.g., one status message and one command per control cycle. Lower levels of the software stack generally have tighter real-time requirements than higher levels of the software stack. At the lowest levels of the software stack, for example, the control cycle can have actual real-time requirements. In this specification, real-time means that a command received at one level of the software stack must be executed and optionally, that a status message be provided back to an upper level of the software stack, within a particular control cycle time. If this real-time requirement is not met, the robot can be configured to enter a fault state, e.g., by freezing all operation.

At a next-highest level, the software stack can include software abstractions of particular components, which will be referred to as motor feedback controllers. A motor feedback controller can be a software abstraction of any appropriate lower-level components and not just a literal motor. A motor feedback controller thus receives state through an interface into a lower-level hardware component and sends commands back down through the interface to the lower-level hardware component based on upper-level commands received from higher levels in the stack. A motor feedback controller can have any appropriate control rules that determine how the upper-level commands should be interpreted and transformed into lower-level commands. For example, a motor feedback controller can use anything from simple logical rules to more advanced machine learning techniques to transform upper-level commands into lower-level commands. Similarly, a motor feedback controller can use any appropriate fault rules to determine when a fault state has been reached. For example, if the motor feedback controller receives an upper-level command but does not receive a lower-level status within a particular portion of the control cycle, the motor feedback controller can cause the robot to enter a fault state that ceases all operations.

At a next-highest level, the software stack can include actuator feedback controllers. An actuator feedback controller can include control logic for controlling multiple robot components through their respective motor feedback controllers. For example, some robot components, e.g., a joint arm, can actually be controlled by multiple motors. Thus, the actuator feedback controller can provide a software abstraction of the joint arm by using its control logic to send commands to the motor feedback controllers of the multiple motors.

At a next-highest level, the software stack can include joint feedback controllers. A joint feedback controller can represent a joint that maps to a logical degree of freedom in a robot. Thus, for example, while a wrist of a robot might be controlled by a complicated network of actuators, a joint feedback controller can abstract away that complexity and exposes that degree of freedom as a single joint. Thus, each joint feedback controller can control an arbitrarily complex network of actuator feedback controllers. As an example, a six degree-of-freedom robot can be controlled by six different joint feedback controllers that each control a separate network of actual feedback controllers.

Each level of the software stack can also perform enforcement of level-specific constraints. For example, if a particular torque value received by an actuator feedback controller is outside of an acceptable range, the actuator feedback controller can either modify it to be within range or enter a fault state.

To drive the input to the joint feedback controllers, the software stack can use a command vector that includes command parameters for each component in the lower levels, e.g., a positive, torque, and velocity, for each motor in the system. To expose status from the joint feedback controllers, the software stack can use a status vector that includes status information for each component in the lower levels, e.g., a position, velocity, and torque for each motor in the system. In some implementations, the command vectors also include some limit information regarding constraints to be enforced by the controllers in the lower levels.

At a next-highest level, the software stack can include joint collection controllers. A joint collection controller can handle issuing of command and status vectors that are exposed as a set of part abstractions. Each part can include a kinematic model, e.g., for performing inverse kinematic calculations, limit information, as well as a joint status vector and a joint command vector. For example, a single joint collection controller can be used to apply different sets of policies to different subsystems in the lower levels. The joint collection controller can effectively decouple the relationship between how the motors are physically represented and how control policies are associated with those parts. Thus, for example if a robot arm has a movable base, a joint collection controller can be used to enforce a set of limit policies on how the arm moves and to enforce a different set of limit policies on how the movable base can move.

At a next-highest level, the software stack can include joint selection controllers. A joint selection controller can be responsible for dynamically selecting between commands being issued from different sources. In other words, a joint selection controller can receive multiple commands during a control cycle and select one of the multiple commands to be executed during the control cycle. The ability to dynamically select from multiple commands during a real-time control cycle allows greatly increased flexibility in control over conventional robot control systems.

At a next-highest level, the software stack can include joint position controllers. A joint position controller can receive goal parameters and dynamically compute commands required to achieve the goal parameters. For example, a joint position controller can receive a position goal and can compute a set point for achieve the goal.

At a next-highest level, the software stack can include one or more task-based controllers, e.g., Cartesian position controllers and Cartesian selection controllers. A Cartesian position controller can receive as input goals in Cartesian space and use inverse kinematics solvers to compute an output in joint position space. The Cartesian selection controller can then enforce limit policies on the results computed by the Cartesian position controllers before passing the computed results in joint position space to a joint position controller in the next lowest level of the stack. For example, a Cartesian position controller can be given three separate goal states in Cartesian coordinates x, y, and z. For some degrees, the goal state could be a position, while for other degrees, the goal state could be a desired velocity.

These functionalities afforded by the software stack thus provide wide flexibility for control directives to be easily expressed as goal states in a way that meshes naturally with the higher-level planning techniques described above. In other words, when the planning process uses a process definition graph to generate concrete actions to be taken, the actions need not be specified in low-level commands for individual robotic components. Rather, they can be expressed as high-level goals that are accepted by the software stack that get translated through the various levels until finally becoming low-level commands. Moreover, the actions generated through the planning process can be specified in Cartesian space in way that makes them understandable for human operators, which makes debugging and analyzing the schedules easier, faster, and more intuitive. In addition, the actions generated through the planning process need not be tightly coupled to any particular robot model or low-level command format. Instead, the same actions generated during the planning process can actually be executed by different robot models so long as they support the same degrees of freedom and the appropriate control levels have been implemented in the software stack.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method comprising:
  obtaining a template robotic control plan that is configurable for a plurality of different robotics applications, wherein:
    the template robotic control plan comprises data defining (i) an adaptation procedure and (ii) a set of one or more open parameters, and
    the template robotic control plan is configurable for one or more of:
      a plurality of different robotic tasks,
      a plurality of different robotic execution environments,
      a plurality of different sets of robotic components, or
      a plurality of different sets of execution constraints;
  obtaining a user input defining a respective value or range of values for each open parameter in the set of open parameters, wherein the user input characterizes a specific robotics application for which the template robotic control plan can be configured; and executing, using the obtained values for the set of open parameters, the adaptation procedure to generate a specific robotic control plan from the template robotic control plan.

Embodiment 2 is the method of embodiment 1, wherein:
the set of open parameters is a set of user-determined open parameters;
the template robotic control plan further comprises data defining a set of one or more planner-determined open parameters; and
executing the adaptation procedure comprises determining values for each planner-determined open parameter in the set of planner-determined open parameters.

Embodiment 3 is the method of any one of embodiments 1 or 2, further comprising executing the specific robotic control plan by a robotic control system.

Embodiment 4 is the method of any one of embodiments 1-3, wherein:
the template robotic control plan comprises data defining a plurality of different adaptation procedures;
the user input identifies a particular adaptation procedure of the plurality of adaptation procedures; and
executing the adaptation procedure to generate the specific robotic control plan from the template robotic control plan comprises executing the particular adaptation procedure.

Embodiment 5 is the method of any one of embodiments 1-4, wherein the template robotic control plan comprises data defining a state machine comprising a plurality of states and a plurality of transitions between states, and wherein the set of open parameters comprises one or more parameters that parameterize a state of the state machine.

Embodiment 6 is the method of any one of embodiments 1-5, wherein the set of open parameters comprises one or more of:
one or more parameters characterizing an execution environment in which the specific robotic control plan will be executed;
an identification of one or more success criteria for the specific robotic control plan;
an identification of one or more robotic components that will execute the robotic control plan;
an identification of one or more objects in the specific robotic execution environment;
a location of one or more robotic components in the specific robotic execution environment;
a location of one or more objects in the specific robotic execution environment; or
one or more parameters characterizing execution constraints on the specific robotic control plan.

Embodiment 7 is the method of any one of embodiments 1-6, wherein:
the template robotic control plan further comprises data defining a default value for a particular open parameter in the set of open parameters; and
obtaining a user input defining a respective value or range of values for each open parameter in the set of open parameters comprises obtaining a user input that indicates that the default value for the particular open parameter is to be used.

Embodiment 8 is a method comprising:
obtaining a learnable robotic control plan comprising data defining a state machine that includes a plurality of states and a plurality of transitions between states, wherein:
one or more states of the state machine are learnable states, and
each learnable state comprises data defining (i) one or more learnable parameters of the learnable state and (ii) a machine learning procedure for automatically learning a respective value for each learnable parameter of the learnable state; and
processing the learnable robotic control plan to generate a specific robotic control plan, comprising:
obtaining data characterizing a robotic execution environment in which the specific robotic control plan is to be executed; and
for each learnable state of the state machine, executing, using the obtained data characterizing the robotic execution environment, the respective machine learning procedures defined by the learnable state to generate a respective value for each learnable parameter of the learnable state.

Embodiment 9 is the method of embodiment 8, further comprising providing the specific robotic control plan to a robotic control system for executing the specific robotic control plan in the robotic execution environment.

Embodiment 10 is the method of any one of embodiments 8 or 9, wherein the state machine further comprises one or more unlearnable states whose parameters have predetermined values that are invariant to different robotic execution environments.

Embodiment 11 is the method of any one of embodiments 8-10, wherein:
a particular learnable state defines default values for each learnable parameter of the particular learnable state, and
the method further comprises:
during a first phase, executing a first version of the specific robotic control plan, comprising executing the particular learnable state according to the default values of the learnable parameters of the particular learnable state;
determining that the machine learning procedure of the particular learnable state has satisfied one or more conditions; and
in response, during a second phase, executing a second version of the specific robotic control plan, comprising executing the particular learnable state according to the generated values of the learnable parameters of the particular learnable state.

Embodiment 12 is the method of any one of embodiments 8-11, wherein the robotic control plan has been generated using an application programming interface (API) that allows a user to define whether a given state of the state machine is learnable or unlearnable.

Embodiment 13 is the method of embodiment 12, wherein the API allows the user to define whether a given state of the state machine is learnable or unlearnable using a single expression in a computer programming language.

Embodiment 14 is the method of any one of embodiments 8-13, wherein the robotic control plan has been generated using an application programming interface (API) that supports calls to one or more third-party machine learning libraries.

Embodiment 15 is a system comprising: one or more computers and one or more storage devices storing instructions that are operable, when executed by the one or more computers, to cause the one or more computers to perform the method of any one of embodiments 1 to 14.

Embodiment 16 is one or more non-transitory computer storage media encoded with a computer program, the program comprising instructions that are operable, when executed by data processing apparatus, to cause the data processing apparatus to perform the method of any one of embodiments 1 to 14.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A method comprising:
   obtaining a learnable robotic control plan comprising data defining a state machine that includes a plurality of states and a plurality of transitions between states, wherein:
      one or more states of the state machine are learnable states, and
      each learnable state comprises data defining (i) one or more learnable parameters of the learnable state and (ii) a machine learning procedure for automatically learning a respective value for each learnable parameter of the learnable state; and
   processing the learnable robotic control plan to generate a specific robotic control plan, comprising:
      obtaining data characterizing a robotic execution environment in which the specific robotic control plan is to be executed; and
      for each learnable state of the state machine, executing, using the obtained data characterizing the robotic execution environment, the respective machine learning procedures defined by the learnable state to generate a respective value for each learnable parameter of the learnable state; and
   providing the specific robotic control plan to a robotic control system to cause a robot to execute the specific robotic control plan in the robotic execution environment.

2. The method of claim 1, wherein the state machine further comprises one or more unlearnable states whose parameters have predetermined values that are invariant to different robotic execution environments.

3. The method of claim 1, wherein:
   a particular learnable state defines default values for each learnable parameter of the particular learnable state, and
   the method further comprises:
      during a first phase, executing a first version of the specific robotic control plan, comprising executing the particular learnable state according to the default values of the learnable parameters of the particular learnable state;
      determining that the machine learning procedure of the particular learnable state has satisfied one or more conditions; and
      in response, during a second phase, executing a second version of the specific robotic control plan, comprising executing the particular learnable state according to the generated values of the learnable parameters of the particular learnable state.

4. The method of claim 1, wherein the robotic control plan has been generated using an application programming interface (API) that allows a user to define whether a given state of the state machine is learnable or unlearnable.

5. The method of claim 4, wherein the API allows the user to define whether a given state of the state machine is learnable or unlearnable using a single expression in a computer programming language.

6. The method of claim 1, wherein the robotic control plan has been generated using an application programming interface (API) that supports calls to one or more third-party machine learning libraries.

7. A system comprising one or more computers and one or more storage devices storing instructions that are operable, when executed by the one or more computers, to cause the one or more computers to perform operations comprising:
   obtaining a learnable robotic control plan comprising data defining a state machine that includes a plurality of states and a plurality of transitions between states, wherein:
      one or more states of the state machine are learnable states, and
      each learnable state comprises data defining (i) one or more learnable parameters of the learnable state and (ii) a machine learning procedure for automatically learning a respective value for each learnable parameter of the learnable state; and
   processing the learnable robotic control plan to generate a specific robotic control plan, comprising:
      obtaining data characterizing a robotic execution environment in which the specific robotic control plan is to be executed; and
      for each learnable state of the state machine, executing, using the obtained data characterizing the robotic execution environment, the respective machine learning procedures defined by the learnable state to generate a respective value for each learnable parameter of the learnable state; and
   providing the specific robotic control plan to a robotic control system to cause a robot to execute the specific robotic control plan in the robotic execution environment.

8. The system of claim 7, wherein the state machine further comprises one or more unlearnable states whose parameters have predetermined values that are invariant to different robotic execution environments.

9. The system of claim 7, wherein:
a particular learnable state defines default values for each learnable parameter of the particular learnable state, and
the operations further comprise:
during a first phase, executing a first version of the specific robotic control plan, comprising executing the particular learnable state according to the default values of the learnable parameters of the particular learnable state;
determining that the machine learning procedure of the particular learnable state has satisfied one or more conditions; and
in response, during a second phase, executing a second version of the specific robotic control plan, comprising executing the particular learnable state according to the generated values of the learnable parameters of the particular learnable state.

10. The system of claim 7, wherein the robotic control plan has been generated using an application programming interface (API) that allows a user to define whether a given state of the state machine is learnable or unlearnable.

11. The system of claim 10, wherein the API allows the user to define whether a given state of the state machine is learnable or unlearnable using a single expression in a computer programming language.

12. The system of claim 7, wherein the robotic control plan has been generated using an application programming interface (API) that supports calls to one or more third-party machine learning libraries.

13. One or more non-transitory computer storage media encoded with computer program instructions that when executed by a plurality of computers cause the plurality of computers to perform operations comprising:
obtaining a learnable robotic control plan comprising data defining a state machine that includes a plurality of states and a plurality of transitions between states, wherein:
one or more states of the state machine are learnable states, and
each learnable state comprises data defining (i) one or more learnable parameters of the learnable state and (ii) a machine learning procedure for automatically learning a respective value for each learnable parameter of the learnable state; and
processing the learnable robotic control plan to generate a specific robotic control plan, comprising:
obtaining data characterizing a robotic execution environment in which the specific robotic control plan is to be executed; and
for each learnable state of the state machine, executing, using the obtained data characterizing the robotic execution environment, the respective machine learning procedures defined by the learnable state to generate a respective value for each learnable parameter of the learnable state; and
providing the specific robotic control plan to a robotic control system to cause a robot to execute the specific robotic control plan in the robotic execution environment.

14. The non-transitory computer storage media of claim 13, wherein the state machine further comprises one or more unlearnable states whose parameters have predetermined values that are invariant to different robotic execution environments.

15. The non-transitory computer storage media of claim 13, wherein:
a particular learnable state defines default values for each learnable parameter of the particular learnable state, and
the operations further comprise:
during a first phase, executing a first version of the specific robotic control plan, comprising executing the particular learnable state according to the default values of the learnable parameters of the particular learnable state;
determining that the machine learning procedure of the particular learnable state has satisfied one or more conditions; and
in response, during a second phase, executing a second version of the specific robotic control plan, comprising executing the particular learnable state according to the generated values of the learnable parameters of the particular learnable state.

16. The non-transitory computer storage media of claim 13, wherein the robotic control plan has been generated using an application programming interface (API) that allows a user to define whether a given state of the state machine is learnable or unlearnable.

17. The non-transitory computer storage media of claim 16, wherein the API allows the user to define whether a given state of the state machine is learnable or unlearnable using a single expression in a computer programming language.

18. The non-transitory computer storage media of claim 13, wherein the robotic control plan has been generated using an application programming interface (API) that supports calls to one or more third-party machine learning libraries.

* * * * *